Figure 4:
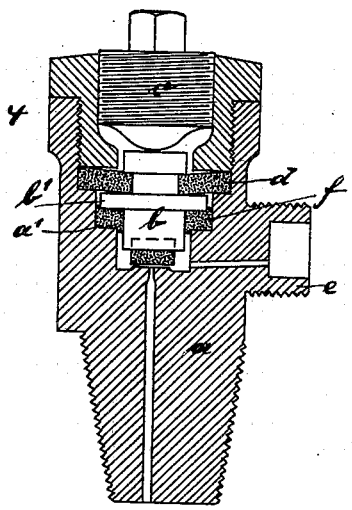

No. 653,382. Patented July 10, 1900.
H. L. FUGE.
VALVE FOR BOTTLES CONTAINING GASES OR LIQUIDS, &c.
(Application filed Sept. 18, 1899.)
(No Model.) 2 Sheets—Sheet 1.
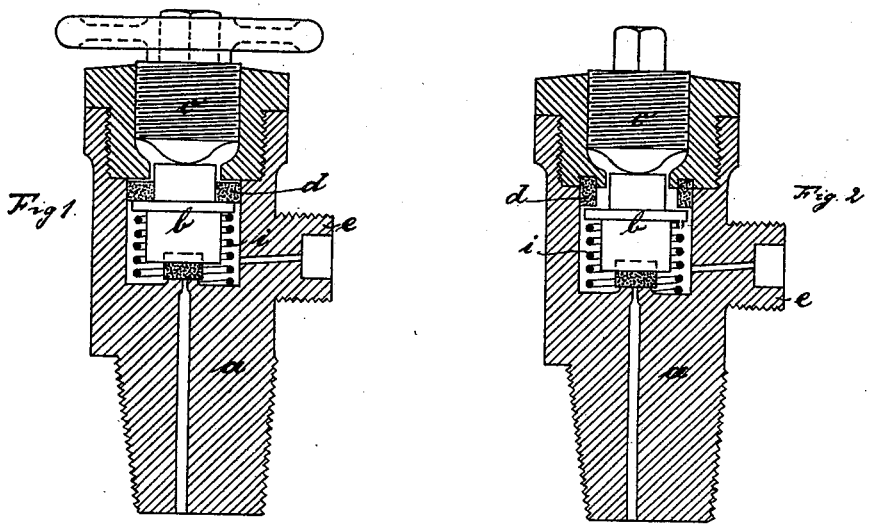
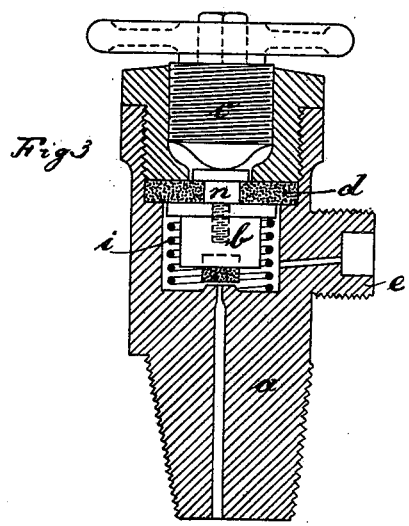

No. 653,382. Patented July 10, 1900.
H. L. FUGE.
VALVE FOR BOTTLES CONTAINING GASES OR LIQUIDS, &c.
(Application filed Sept. 18, 1899.)
(No Model.)
2 Sheets—Sheet 2.

WITNESSES:

INVENTOR

United States Patent Office.

HEINRICH LOUIS FUGE, OF HANOVER, GERMANY.

VALVE FOR BOTTLES CONTAINING GASES OR LIQUIDS, &c.

SPECIFICATION forming part of Letters Patent No. 653,382, dated July 10, 1900.

Application filed September 18, 1899. Serial No. 730,900. (No model.)

*To all whom it may concern:*

Be it known that I, HEINRICH LOUIS FUGE, manufacturer, a subject of the German Emperor, residing at 54 Friesenstrasse, Hanover, German Empire, have invented certain new and useful Improvements in Valves for Bottles Containing Gases or Liquids Under High Pressure, of which the following is a full, clear, and exact description, reference being had to the accompanying drawings, and to the letters of reference marked thereon, which form part of this specification.

The valves of this kind which have become known thus far are so constructed that the valve-body proper is attached to a spindle which is guided in a kind of stuffing-box in the valve-case, wherein it is screwed down upon the valve-seat in order to close the mouth of the bottle or wherein it is raised when the bottle is to be opened. The use of such valves discloses, however, many disadvantages which render them nearly unfit for practical use, for they have on account of the stuffing-box a heavy movement and remain never tight-fitting, as the packing of the stuffing-box becomes loose after the valve has been used for but a short time. For the reasons stated valves of this construction will permit the escape of gas or liquid from the bottle. These drawbacks are completely overcome by my invention, for I place the valve-body proper in a valve-casing and press it by means of a screw-threaded stem upon its seat—the aperture for the outlet of the gas or liquid.

The valve embodying my invention prevents the escape of gas or liquid from the bottle alongside the valve-body when the valve has been opened by providing either the valve-body or the casing, or both, with a packing-ring of suitable material, against which the valve-body fits snugly when it is being raised from its seat, so that any escape of gas or liquid alongside of the valve-body is entirely excluded.

The valve of my invention has also an easy movement in opening and closing same.

The accompanying drawings illustrate in Figures 1, 2, 3, and 4 several forms of valves embodying my invention.

Like letters denote similar parts in all the figures.

In Fig. 1, $a$ denotes the casing of the valve, with the valve-body $b$, the latter provided with a small disk of hard rubber or other suitable material in order to make the valve-body fit tightly against the aperture for the outlet of the gas. A screw-threaded stem $c$ is carried in the screw-threaded head of the valve-case, by means of which the valve-body $b$ may be firmly pressed down upon its seat. The small spiral spring $i$, placed around the stem, tends to press the stem upward and eases thus the raising of the valve-body; but this spring may be omitted, if desired. The face of the valve-body $b$, opposite to its seat, is provided with a packing-ring of suitable soft material, which is pressed tightly against the head of the valve-case when the valve-body $b$ is raised from its seat by the pressure of the outflowing gas or liquid. This packing closes the valve-body $b$ perfectly whenever the valve-body is raised from its seat, so that thereby the escape of any gas alongside the valve-body to the outside is entirely prevented. $e$ is the outlet for the gas or liquid from the bottle.

The valve shown in Fig. 2 differs from that of Fig. 1 only in the arrangement of the packing $d$, which is here not fastened to the valve-body $b$, but to the head of the valve-case. Otherwise the construction is similar to that shown in Fig. 1.

Fig. 3 shows another slight modification of the valves in Figs. 1 and 2, the packing $d$ of this valve being clamped in the valve-case by the head of same and the packing being also secured to the valve-body $b$ by means of the small screw $n$.

Fig. 4 illustrates another modification of the valve embodying my invention, which differs from the before-described valves by placing several packing-rings on the valve-body, one of which is fitted in such a manner that it is compressed between the valve-body and a projection in the inner wall of the valve-case when the valve-body is screwed down upon its seat. As soon as the valve-body is raised but the least distance from its seat in order to open the bottle this packing-ring will expand, so that the space between valve body and case is entirely filled up by it. If now the valve-body be raised still higher, the second packing-ring $d$ will prevent the gas from escaping alongside the valve-body.

A packing-ring $f$ is placed on the lower part of the valve-body $b$ beside the packing-ring $d$. This ring $f$ is flattened, and therefore widened in its circumference when it is compressed between the collar-like projection $b'$ of the valve-body and the projection $a'$ of the valve-case $a$ by screwing the valve-body upon its seat. The ring $f$ lays itself hereby snugly against the wall of the casing $a$ and fills up the entire space between the case and valve-body, thus preventing the escape of any gas or liquid alongside the valve-body. If the latter is now raised still higher, the ring $d$ will be pressed against the wall of the case by the gas or liquid and prevent the escape of the latter alongside the valve-body, so that by the arrangement of these two packing-rings the valve is made perfectly tight, whereby any escape of gas or liquid otherwise than through the regular outlet is completely prevented.

The valves of my invention fit tightly even after use for considerable time and after the packing-rings have become somewhat deformed.

Having now described my invention, what I wish to secure by United States Letters Patent is—

1. In combination, the casing, a valve-body, having an annular flange with a portion of the body projecting above and below the flange, a packing-ring arranged above the flange and around the upwardly-extending portion of the body, yielding means engaging the under side of the flange and surrounding the lower portion of the body and a stem independent of the valve-body and bearing thereon, said packing engaging a seat in the casing above the annular flange substantially as described.

2. In combination, the casing, the valve having the shoulder $b'$ and packing above and below the said shoulder and between the same and bearing-surfaces on the casing, substantially as described.

In witness whereof I have hereunto set my hand in presence of two witnesses.

HEINRICH LOUIS FUGE.

Witnesses:
 WOLDEMAR HAUPT,
 HENRY HASPER.